United States Patent [19]

Nichols

[11] Patent Number: 4,972,262

[45] Date of Patent: Nov. 20, 1990

[54] REAL TIME EDGE DETECTION

[75] Inventor: Steven C. Nichols, Maple Grove, Minn.

[73] Assignee: Honeywell Inc., Minneapolis, Minn.

[21] Appl. No.: 263,309

[22] Filed: Oct. 27, 1988

[51] Int. Cl.$^5$ ............................................. H04N 5/14
[52] U.S. Cl. ..................................... 358/160; 358/166; 358/162
[58] Field of Search ................. 358/160, 96, 162, 166; 382/22

[56] References Cited

U.S. PATENT DOCUMENTS

| | | |
|---|---|---|
| 3,328,761 | 6/1967 | Yamamoto et al. |
| 3,609,685 | 9/1971 | Deutsch . |
| 3,708,753 | 1/1973 | Rädecke ............................ 358/162 |
| 4,020,463 | 4/1977 | Himmel . |

FOREIGN PATENT DOCUMENTS

| | | | |
|---|---|---|---|
| 0179594 | 4/1986 | European Pat. Off. ............ | 358/166 |
| 0050615 | 4/1977 | Japan .................................. | 358/166 |
| 0125584 | 8/1982 | Japan .................................. | 382/22 |

Primary Examiner—James J. Groody
Assistant Examiner—David E. Harvey
Attorney, Agent, or Firm—Michael B. Atlass; C. G. Mersereau

[57] ABSTRACT

A detector for detecting, in images of camera scanned scenes, edges which extend generally parallel to the scanning lines. Accordingly, by comparing an undelayed signal to a first signal delayed by slightly more than one scan line, a differential can be obtained at a 45 degree angle going downward from the left to the right of the image. By delaying a second signal slightly less than one scan line, the differential becomes 45 degrees going downward from the right to the left of the image. These differentials are utilized to detect edges extending parallel to the scan lines.

3 Claims, 7 Drawing Sheets

IMPROVED CIRCUIT

EDGE DETECTION WAVEFORMS

CONCEPT

ROBERTS EDGE DETECTOR
FOR EDGES EXTENDING
TRANSVERSELY RELATIVE
TO SCAN LINES

IMAGE

EDGES FROM
EVEN FIELD

EDGES FROM
ODD FIELD

COMBINATION OF
EVEN AND ODD
FEILD EDGES

IMPROVED CIRCUIT

CORRELATING THE
PERPENDICULAR DIRECTIONS

REAL TIME EDGE DETECTION

BACKGROUND OF THE INVENTION

The invention relates to a real time edge detector for detecting edges which extend parallel to the camera scan lines.

Conventional edge detecting methods are effective to detect edges which extend generally normal to the camera scanning lines but are inherently inefficient with respect to edges which extend generally parallel to the scanning lines.

SUMMARY OF THE INVENTION

The invention herein is directed to a new and improved circuit and a new and improved method for detecting, in images of camera scanned scenes, edges therein which extend generally parallel to the scanning lines.

A main object of the invention is to provide a new and improved real time edge detector capable of detecting edge components which extend generally transversely but having components which are parallel to the scan lines.

Other objects and advantages of the invention will become apparent from the following specification, appended claims and the attached drawings.

DETAILED DESCRIPTION

The invention relates to the detection of edges and lines in the images of optical scenes. Although not intended to be limiting in any way, as used herein edge gradients are referred to as being derived from the application of the first differential and thinned edges or lines are referred to as being derived from the application of the second differential. Edges generated by the first differential are referred to in the art as Roberts edges and are likewise referred to that way herein.

Figure 1:
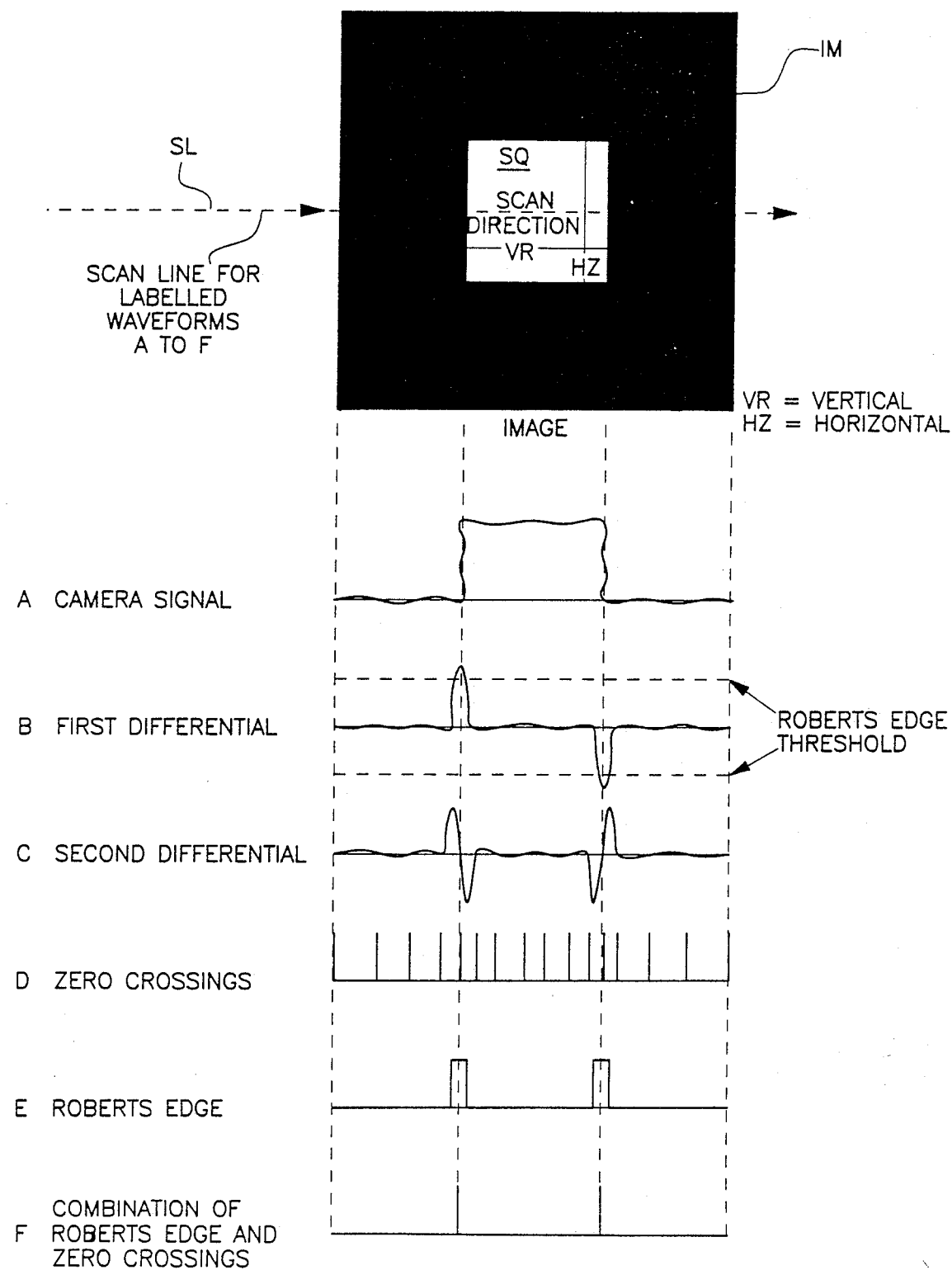
FIG. 1 shows edge detection waveforms of a horizontally scanned image.

FIG. 1 is presented to provide background information as an aid to an understanding of the invention. This figure shows how edges and lines in an image can be detected by the application of the first and second differentials. FIG. 1 shows an image IM and a set of labeled waveforms A to F resulting from the indicated scan line SL of image IM.

The first and second differential waveforms reveal the encountering of two vertical edges VR of the square SQ and also some noise signals which are indicated by wavy lines of small amplitude on the axes of waveforms A to C.

The second differential waveform C has sharp positive and negative going parts which inherently involve zero crossings. The desired marking of the zero crossings of the edges are, as shown by the zero crossings waveform D, accompanied by the undesired markings of the zero crossings of the noise signals.

The first differential waveform B is thresholded as indicated and the peaks are used to generate pulses of the Roberts edge waveform E. These pulses are used as a mask by being ANDED with the zero crossings waveform D to eliminate the noise signals and this results in the waveform F of the combination of Roberts edge waveform E and the zero crossings waveform D as shown in FIG. 1.

The edge detection process illustrated in FIG. 1 is effective to detect the vertical edges VR of the square SQ of the image IM but not the horizontal edges HZ thereof which are parallel to the scanning lines.

The invention herein is directed to an edge detection concept which operates to detect edges having components which extend parallel to the scanning lines. This concept is illustrated more or less schematically in FIGS. 2A and 2B.

Figure 2A:
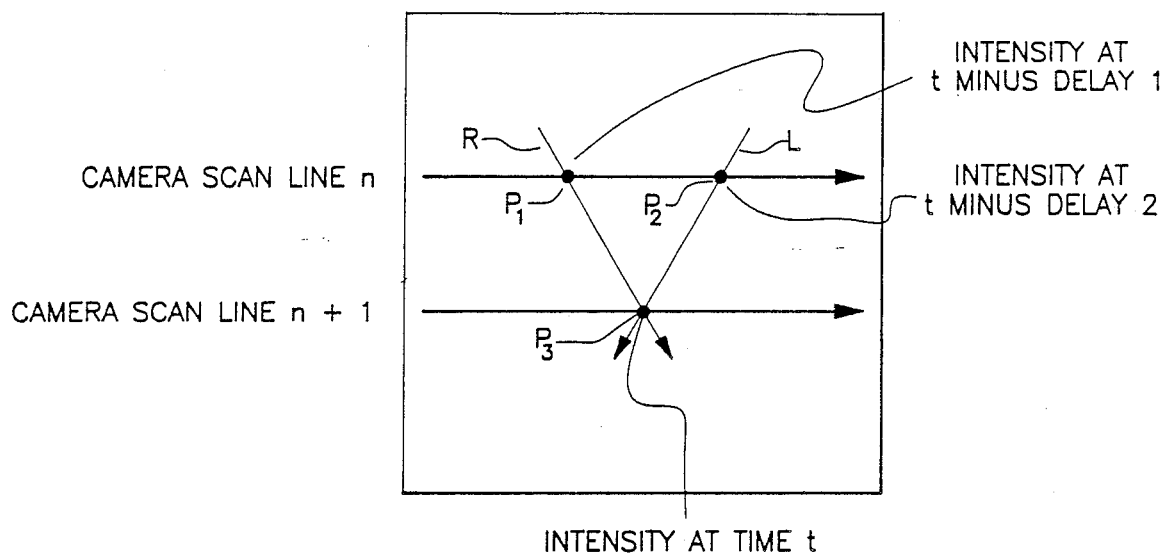
FIG. 2A illustrates the general concept of utilizing time delay elements for detecting edges which extend transversely of the camera scan lines.

As shown in FIG. 2A, by comparing an undelayed signal P3 to one P1 delayed by slightly more than one scan line, a differential can be obtained at a 45 degree angle going downward from the left to the right of the image. By delaying signal P2 slightly less than one scan line, the differential becomes 45 degrees going downward from the right to the left of the image. Advantage may be taken of the interlaced scanning of the camera output in order to use only one variable delay. During the odd fields, the delay is chosen so that differentials are always going downward from left to right while during the even fields the delay is changed so the differential goes downward from right to left. This method has the effect of causing horizontal and vertical edges to be detected during both fields with the same sensitivity, while edges at other angles are detected during one or the other field with more sensitivity.

Figure 2B:
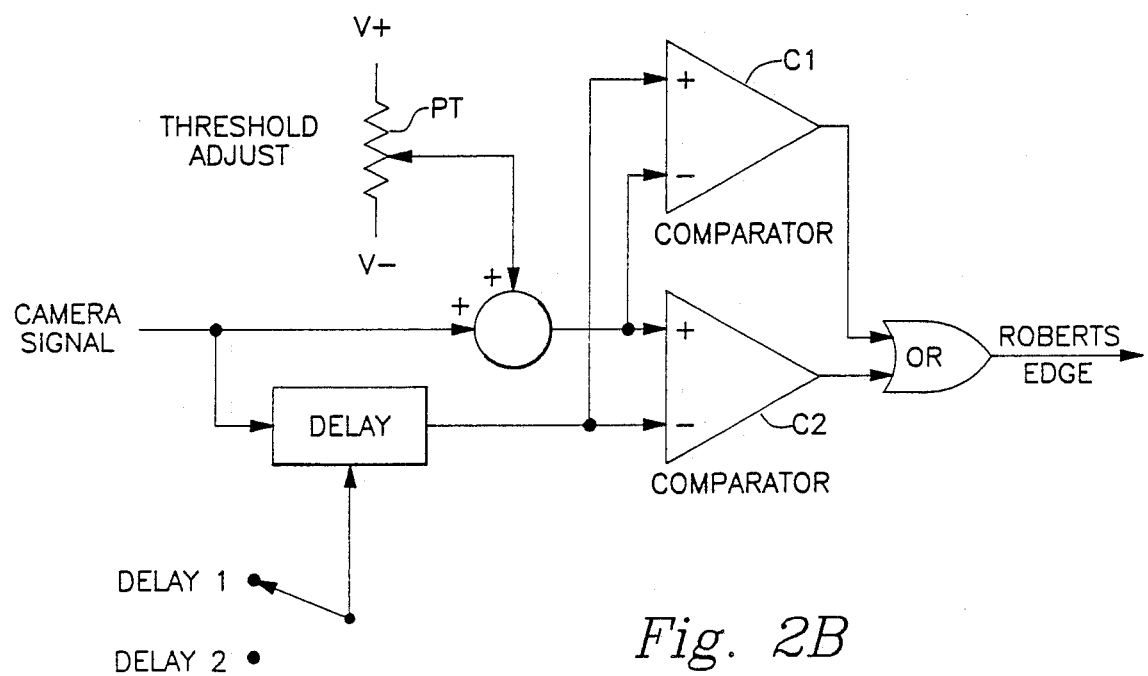
FIG. 2B shows a rudimentary Roberts edge detector embodying the invention.

FIG. 2B shows a rudimentary circuit embodying the above concept. This circuit, which thresholds the first differential with analog comparators $C_1$ and $C_2$ and a manually adjustable potentiometer PT is in effect a Roberts edge detector for detecting edge components extending transversely of the scan lines. Comparators C1 and C2 are respectively connected in an opposite sense to the threshold camera signal lines and the delayed camera signal line to facilitate, with reference to FIG. 2A, the detection of both positive and negative differentials of the points P1 and P2 relative to point P3. An OR gate outputs a positive signal if either of the comparators outputs a positive signal.

The detection in this circuit of differentials in perpendicular directions is implemented using time delay elements (delay 1 and delay 2) in the form of analog shift registers. These registers are logically very similar to digital shift registers except that an analog voltage or charge rather than a digital value is shifted. This results in an analog delay which is equal to the clock period times the depth of the register and is as accurate as the clock frequency. These registers use one of two kinds of technology which are bit bucket brigade devices or charge coupled devices (CCD). The former act as a bank of capacitors which shift an analog voltage. These operate at frequencies up to 1 MHz and are used primarily for audio applications. The latter shift an analog charge which must be converted to a voltage at the output. These operate at video frequencies (up to 20 MHz) and were used for this project. An example of such a delay device used in a model embodying the invention is the Schlumberger "Bit Analog Shift Register Charge Coupled Device" CCD321A/B455/910.

FIG. 2A shows points P1, P2 and P3 on two adjacent horizontally extending scan lines n and n+1. Considering firstly only points P1 and P3 and, assuming that they are on a transversely extending scan line R, it is seen that by comparing the intensities of points P1 and P3 an edge extending normal to the scan line R will be detectable.

In accordance with the invention the intensities at points P1 and P3 can be obtained simultaneously by the use of time delay means as illustrated in the circuit of FIG. 2B. In that circuit the camera signal (point P3) is applied to the positive side of the comparator and a delayed camera signal (point P1) is applied to the negative side of the comparator. In this case the time delay of the time delay 1 is somewhat greater than the time interval for a horizontal scan line and this places point P3 downwardly to the right relative to P1.

Figure 3A:
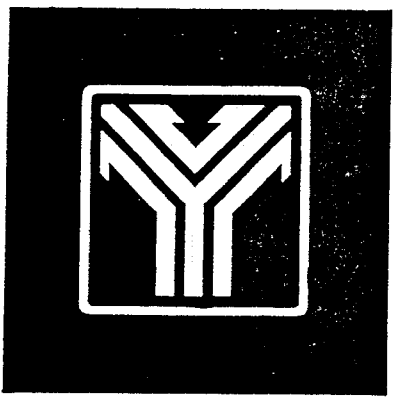
FIGS. 3A to 3D illustrate the directional sensitivity of an edge detector circuit embodying the invention.
Figure 3B:
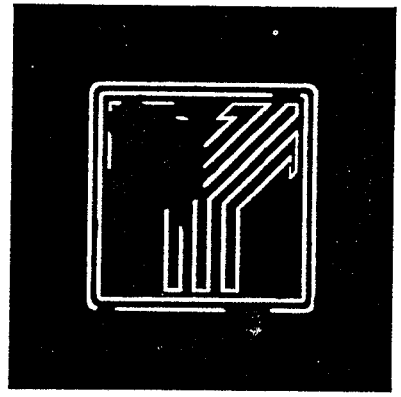

If the image of FIG. 3A were being scanned, the scanning operation with delay 1 would result in an image similar in nature to the image of FIG. 3B from the camera standpoint that it is primarily the edges an components of edges which are normal to the scan line R of FIG. 2A that are detected.

Referring to points P2 and P3 of FIG. 2A, these points are also on the two adjacent horizontally extending scan lines n and n+1. Assuming that points P2 and P3 are on a transversely extending scan line L, it is seen that by comparing the intensities of points P2 and P3 an edge extending normal to the scan line L will be detectable.

In accordance with the invention the intensities at points P2 and P3 can also be obtained simultaneously by the use of time delay means as illustrated in the comparator circuit of FIG. 2B. In that circuit a delayed camera signal (point P2) is applied to the negative side of the comparator. In this case the time delay of the time delay 2 is somewhat less than the time interval for a horizontal scan line and this places point P3 downwardly to the left relative to P2.

Figure 3C:
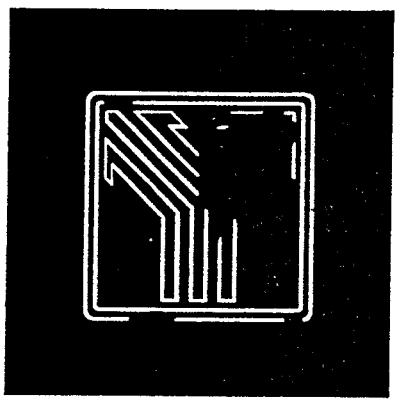

The scanning operation with delay 2 would result in an image similar in nature to the image of FIG. 3C from the standpoint that it is primarily edges and components of edges which are normal to the scan line L of FIG. 2A that are detected.

Figure 3D:
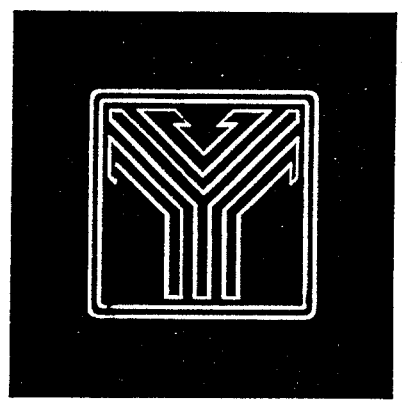

The results of FIGS. 3B and 3C may be combined to obtain the composite image of FIG. 3D. An especially desirable arrangement would involve the use of the interlaced fields system wherein the time delay 1 would be used for one field and the time delay 2 would be used for the other. In that case the vertical displacement between the two fields would only be the width of one scan line and this would not be discernible to the human eye.

It is the essence of the invention that the relative positions of points P1 and P3 are established by a time delay 1 and that the relative positions of points P2 and P3 are established by a time delay 2 of smaller magnitude. In this respect it is by definition herein that the time delay 1 defines an edge detecting locus R which extends transversely relative to and intersects the horizontal scan lines n and n+1. Likewise the time delay 2 defines an edge detecting locus L which extends transversely relative to and intersects the horizontal scan lines n and n+1. If interlaced fields were utilized, the lines n and n+1 would be interleaved relative to a separate set of scan lines n' and n'+1.

Although it is not absolutely essential, it is preferable that the edge detecting loci R and L of FIG. 2A be at angles of 45 degrees relative to the horizontal scan lines. In a video system having a 4 to 3 ratio raster and scanning at 525 horizontal lines, repeated 30 times per second, a 45 degree locus down and to the right would be obtained with a time delay of 6.35 $\mu$sec times $(1+1/700)$ and a 45 degree locus down and to the left would be obtained with a time delay of 6.5 $\mu$sec times $(1-1/700)$.

Figure 4:
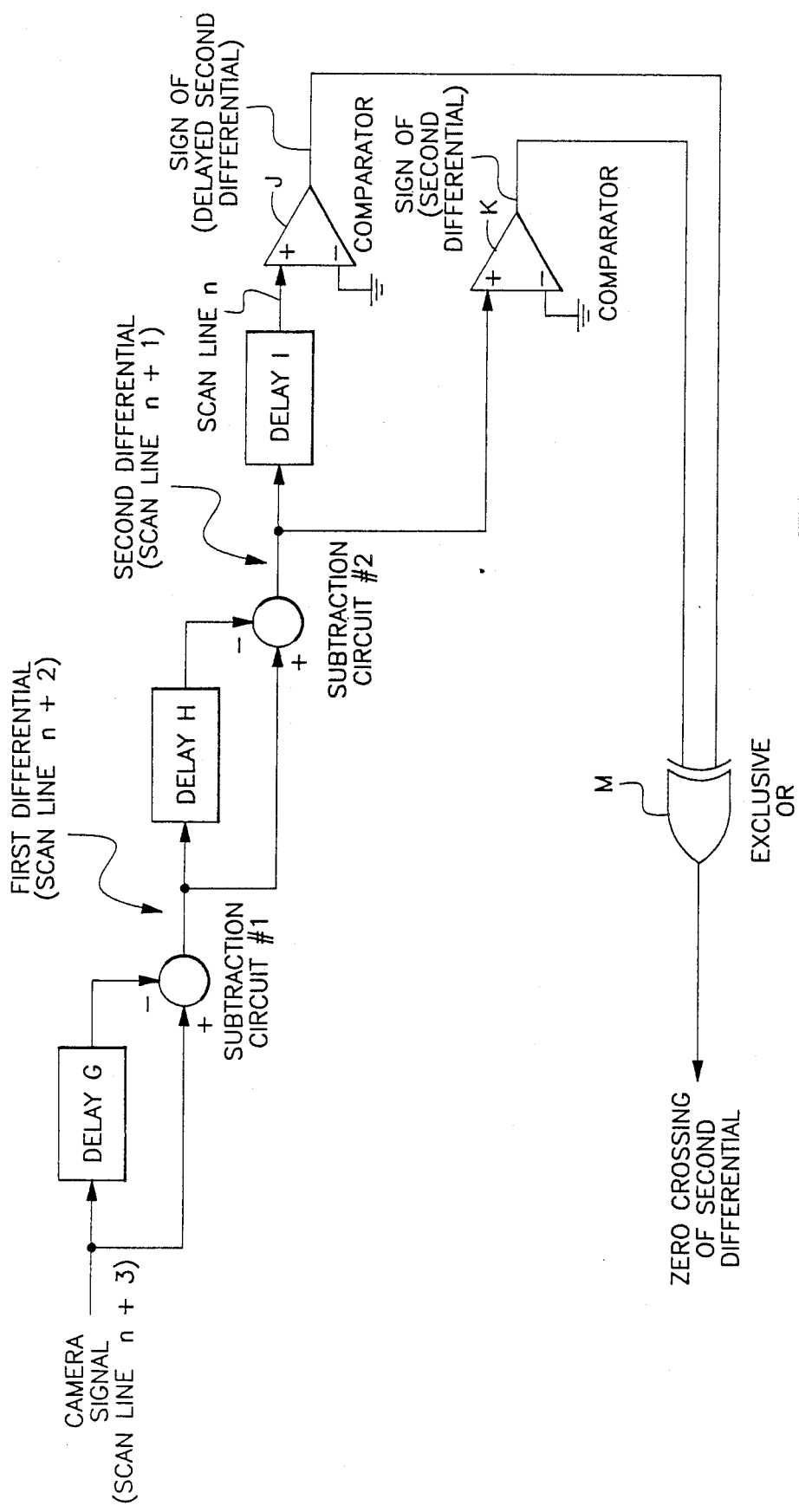
FIGS. 4 and 5 show two embodiments of edge detector circuits embodying the invention.

While the rudimentary circuit of FIG. 2B functions to obtain the first differential (Roberts edge) in accordance with the invention, the circuit of FIG. 4 functions to obtain both the first and second differentials in accordance with the invention. For the sake of simplicity in illustration, the circuit of FIG. 4 only detects edges extending downwardly to the left or right but it could be routinely modified to be operative in both directions.

Three identical delay units G, H and I are used and sets of four sequential scan lines n to n+3 are involved on a continuing basis for detecting edge components of scan line n+3. The first differential is obtained by subtracting the delayed camera signal from the camera signal (via subtraction circuit #1) and the second differential is obtained by subtracting (via subtraction circuit #2) the delayed first differential from the undelayed first differential.

Zero crossings of the second differential are obtained by comparing the delayed second differential signal (delayed by delay unit I) with the undelayed second differential (via comparators J and K). Zero crossings are indicated wherein comparators J and K output identical signs as determined by the exclusive OR element M.

The circuit of FIG. 4 does embody the invention but the use of subtraction circuits introduces undesired phase delays and edge inaccuracies. This design would be satisfactory under some circumstances but an alternate circuit illustrated in FIG. 5 is preferred.

Figure 5:
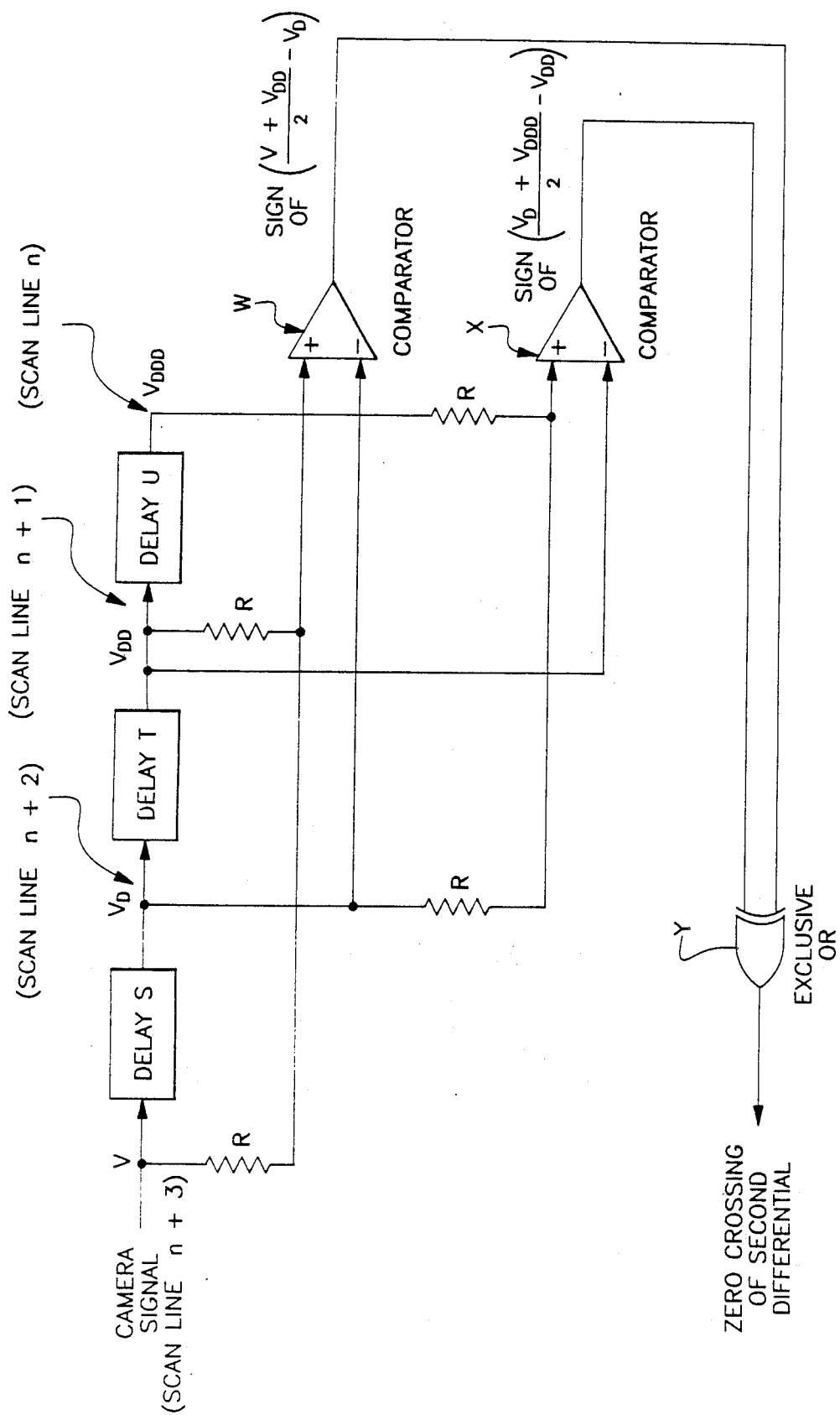

The circuit of FIG. 5 is based on the following mathematical principles:
If V = the camera signal
and $V_D$ = a delayed camera signal
and $V_{DD}$ = a twice delayed camera signal then the first differential is approximated as $$V - V_D \tag{1}$$

the second differential is approximated as $$(V - V_D) - (V_D - V_{DD}) \tag{2}$$

$$= V - 2V_D + V_{DD} \tag{3}$$

As the only point of interest is where the second differential crosses zero, the equation can be divided by two without affecting performance.

$$= \frac{V + V_{DD}}{2} - V_D \tag{4}$$

This is equivalent to the average of the camera signal plus the twice delayed camera signal compared with the delayed camera signal. This results in the improved circuit shown in FIG. 5.

For the sake of simplicity in illustration, the circuit of FIG. 5 also (as in FIG. 4) only detects edges extending downwardly to the left or right but it could also be routinely modified to be operative for both directions.

Three identical delay units S, T and U are used and sets of four sequential scan lines n to n+3 are involved on a continuing basis for detecting edge components of scan line n+3. The first differential $V_D$ results from the delay of the delay S relative to the camera signal, the second differential $V_{DD}$ results from the delay of the delay T relative to the first differential and the third differential $V_{DDD}$ results from the delay of the delay U relative to the second differential.

A comparator W in the circuit of FIG. 5 has inputs of the values of the camera signal and the first and second differentials in accordance with equation (4) above and outputs the sign determined by the comparator in processing the inputs.

Zero crossings of the second differential are obtained by comparing the output of comparator W with the undelayed second differential via comparator X. Zero crossings are indicated wherein the comparators W and X output identical signs a determined by the exclusive OR element Y.

Figure 6:
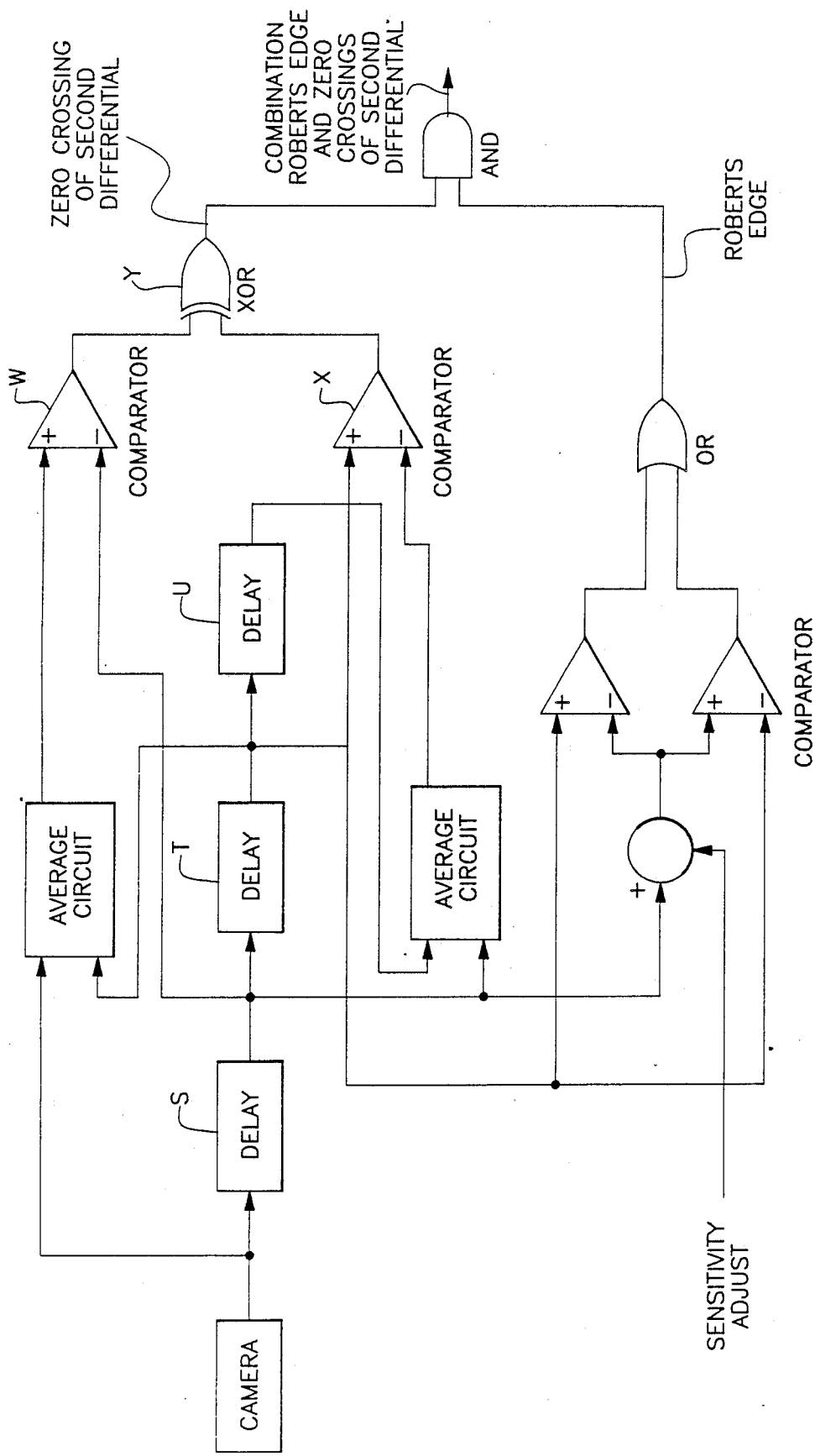
FIG. 6 shows in a more completed form the embodiment of the invention illustrated in FIG. 5.

FIG. 6 shows the circuit of FIG. 5 combined with a Robers edge detector and so has reference letters according to FIG. 5. This circuit combines waveforms D and E of FIG. 1 and outputs waveform F thereof which is the combination of Roberts edge (E) and the zero crossings (D) of the second differential (C). The purpose of Roberts edge in this circuit is to mask the noise from the zero crossings of the second differential.

Figure 7:
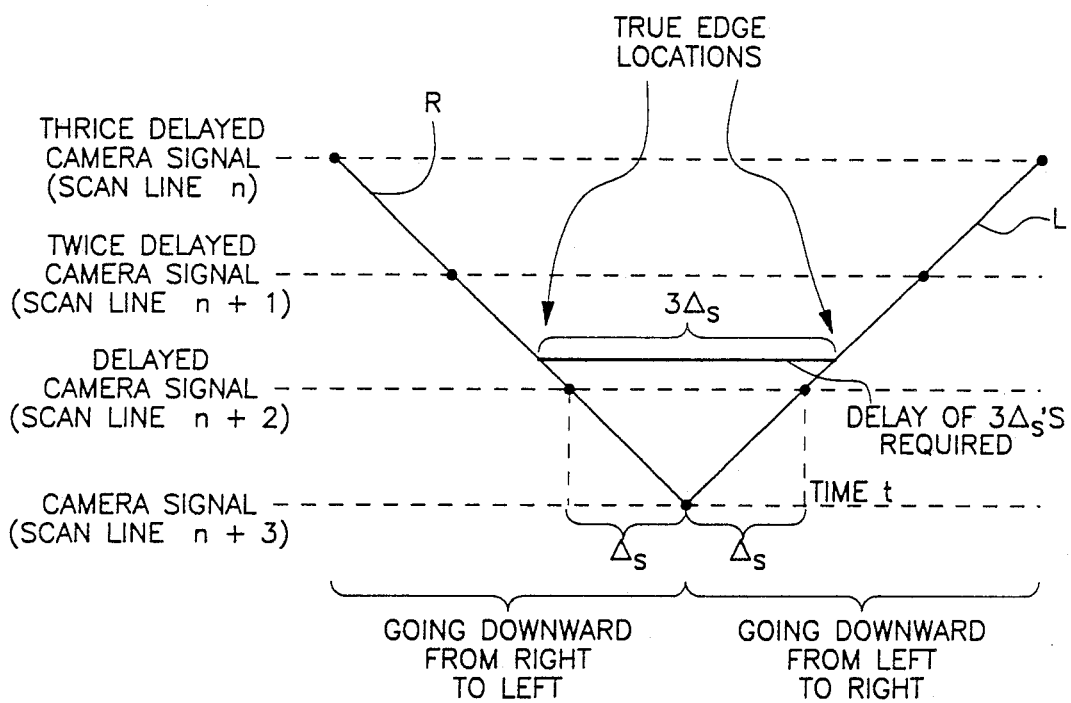
FIG. 7 is a diagram which correlates the two perpendicular directions of edges detected by circuits embodying the invention.

A remaining problem yet to be referred to is that edges found in the two perpendicular directions (R and L in FIG. 2A) must still be correlated since the different directions find edges at different times. As shown in FIG. 7, this requires a slight delay in edges found in the direction going downward from right to left. Since the amount to delay is determined by the analog delay clock, a simple digital shift register can be used.

In the case of edge detection using the method herein of zero crossings of second differentials, four video signals are used for each of the directions R and L. These are shown in FIG. 7 as the true video signal at time t and three others which are incremental delays of the true video signal. At any time t there are thus four points in the image corresponding to these four signals which are used to determine if an edge exists or not. Except for the point associated with time t, these points in the image are different for different delays as shown in FIG. 7. When an edge is detected, its true location in the image is at a point halfway between the true video signal at time t and the thrice delayed video signal. It is apparent that this true edge location changes when the delay changes and therefore correlation is required.

If s is the horizontal video scan period and $d_1$ is one value of delay (in direction R) and $d_2$ is the other value of delay (in direction L) and $d_1 = s + \Delta_s$ and $d_2 = s - \Delta_s$ then, as indicated in FIG. 7, the edges found when using $d_1$ must be delayed by 3 $\Delta_s$ in order to correlate with the edges found when using $d_2$.

It is claimed:

1. A circuit for detecting edges in an image of an optical scene scanned by a TV camera comprising, a TV camera for scanning an optical scene and generating at the output thereof a corresponding voltage (V) which represents horizontal scan lines, first and second time delay means in series, said first time delay means being connected to said camera output, said first and second time delay means being operable to define an edge detecting locus for comparing intensity values on adjacent scan lines, said locus extending transversely relative to and intersecting said scan lines, said first and second time delay means having outputs which respectively output first and second delayed voltages ($V_D$ and $V_{DD}$) of said camera output, and comparator means connected to said camera output and the outputs of said first and second delay means for comparing the average value of the sum of said camera signal voltage signal (V) and the output voltage ($V_{DD}$) of said second time delay means with the output voltage ($V_D$) of said first time delay means and outputting the sign difference, a third time delay means in series with said second time delay means and being operable to contribute to the defining of said edge detecting locus, second comparator means connected to the outputs of all of said time delay means for comparing the average value of the sum of the outputs of said first and third time delay means with the output of said second time delay means and outputting the sign difference, and means connected to both of said comparator means to output zero crossings of said second differential.

2. A circuit according to claim 1 wherein said locus is at an angle of 45 degrees to said horizontal scan lines.

3. A circuit according to claim 1 wherein said locus extends downwardly to the right or downwardly to the left.

* * * * *